Nov. 19, 1963 N. THEODOSEAU 3,111,352

SUPERCONDUCTIVE SOLDERLESS CONNECTOR

Filed Nov. 16, 1959

INVENTOR
NICHOLAS THEODOSEAU

BY George Baron

ATTORNEY

United States Patent Office 3,111,352

Patented Nov. 19, 1963

3,111,352

SUPERCONDUCTIVE SOLDERLESS CONNECTOR

Nicholas Theodoseau, Staatsburg, N.Y., assignor to International Business Machines Corporation, New York, N.Y., a corporation of New York Filed Nov. 16, 1959, Ser. No. 853,178

3 Claims. (Cl. 339—30)

This invention relates to cryogenic electrical circuits in general, and more particularly to connectors for making electrical connections between a cryogenic thin film which has been evaporated onto an insulating substrate and electrical leads.

Since cryogenic devices are operated at temperatures close to absolute zero, a problem arises when it is desired to make electrical connections between a superconductive element and electrical leads leading into or away from such superconductive element. When solder is employed for making connections between superconductive elements and electrical connectors, it has been found that such solder either destroys the very thin films used in cryogenic devices, or the solder that is applied at room temperature will break away from its juncture at the very low temperatures at which such soldered juncture is maintained. It has been found that electrically conductive cements, applied at room temperatures, may also break away from the surfaces they must join electrically when such surfaces are encased in a bath of liquid helium, resulting in unreliable electrical contact and unreliable operation of electrical circuits.

An aspect of the invention is the use of a bimetallic strip wherein one of the two metals forming the strip is a superconductive element. The superconductive strip is in electrical contact with the cryogenic film and when the bimetallic strip and electrical contact are inserted for normal operation in a bath of liquid helium, the bimetallic strip contracts and urges inself against the cryogenic film so as to increase the pressure between the strip and film and add to the reliability of the contact.

It is an object of this invention to provide improved electrical connections at extremely low temperatures.

It is yet another object to provide an electrical connection at extremely low temperatures whose reliability increases at such reduced temperatures.

It is yet a further object to make a solderless electrical connector for use at extremely low temperatures.

The foregoing and other objects, features and advantages of the invention will be apparent from the following more particular description of preferred embodiments of the invention, as illustrated in the accompanying drawings.

Figure 1:
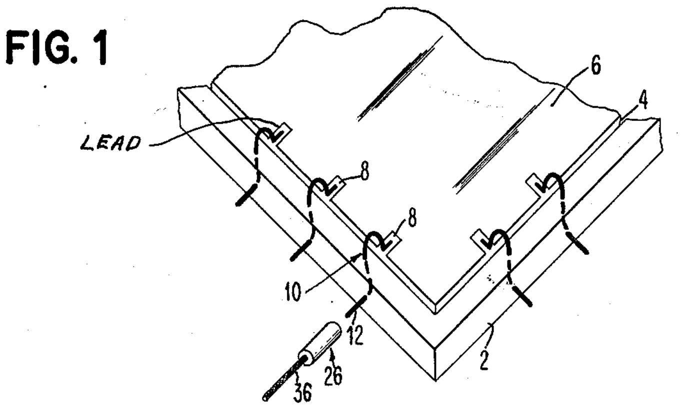
FIG. 1 is an embodiment of the invention employing a bimetallic contact.
Figure 2:
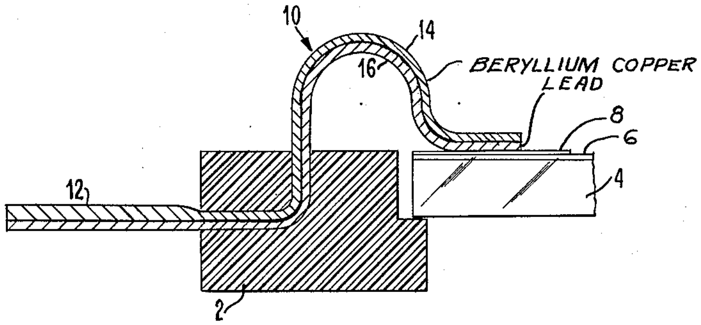
FIG. 2 is an enlarged view of a bimetallic contact is operating position.

Referring to FIG. 1, there is shown a phenolic or ceramic frame 2 in which is positioned a glass substrate 4 on which is deposited a thin film (of the order of 5,000 angstrom units thick) 6, such film being superconductive at temperatures of 8° K. or less. Such films could be lead, tantalum, tin, etc., or alloys including such metals, and their properties are set out on pages 1, 16, etc. in the text by London entitled "Superfluids," vol. 1., published in 1958 by John Wiley and Sons. The film 6 will include restricted areas or lands 8 of superconductive material, for example, lead, which is in contact with bimetallic contact 10, such contact 10 being firmly imbedded in the insulating frame 2 and one terminal 12 juts out substantially rectangularly from the side of frame 2.

The bimetallic strip 10 comprises beryllium copper whose terminal portion 12 is circular in cross-section and its contracting portion 14 is rolled into a strip that is rectangular in cross-section so as to increase the compressive force of such rolled strip against land 8 when such strip is placed with land 8 in a bath near absolute zero. The copper beryllium is coated with a thick layer of lead 16, such thickness being of the order of the thickness of the rolled or flattened beryllium strip 14. Lead has a higher coefficient of expansion than beryllium copper. Consequently, when the entire assembly is lowered into its bath of liquid helium, the contraction of the lead coating 16 will urge the bimetallic contact 10 onto the land 8 with greater force than it would at room temperature.

Figure 3:
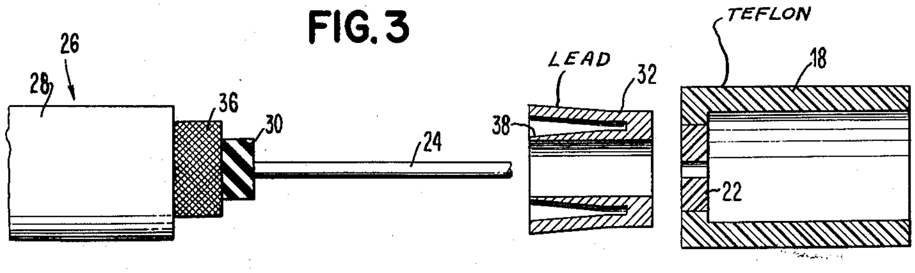
FIG. 3 is an exploded view of the embodiment shown in FIG. 4.
Figure 4:
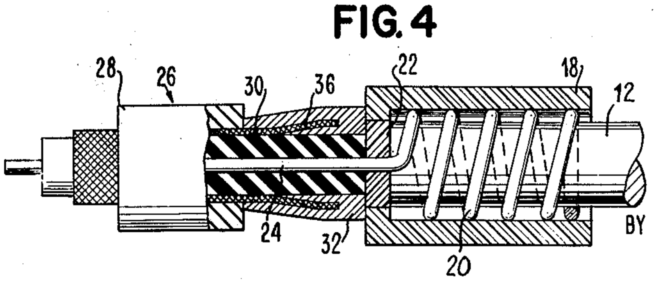
FIG. 4 is a showing of another embodiment of the connector employing a coiled conductor within a contractible insulated housing.

FIGURES 3 and 4 illustrate how the second embodiment of a solderless connector operates. Coaxial cable 26 is stripped as shown in FIGURE 3 so that 28 is the outer insulator of cable 26, 36 is the braided shield, and 30 is the insulator between the braided shield 36 and the inner conductor 24. Such conductor is coated with a thin film of lead so as to make a good superconductive contact with terminal 12. Ferrule 32 is of lead and is slipped over the insulating jacket 30 so that the inner jaw 38 of ferrule 32 is slipped between the braided shield 36 and insulator 30. The ferrule 32 is crimped as shown in FIGURE 4 so as to tightly crimp the braided shield 36 to the insulated member 30.

Teflon collar 22 is slipped over center conductor 24. The stripped conductor 24 is wound on a mandrel to produce coil 20 so that the inner diameter of the coil 20 fits snugly over its mating pin or terminal 12 of FIGURE 1. Teflon cylinder 18 is then slipped over coil 20 and such cylinder 18 is inserted over Teflon collar 22 in order to make a tight fit with the latter. Coil 20 is pulled so that ferrule 32 is urged flush against cylinder 18.

In operation, the solderless connector of FIGURE 3 is placed so that the center conductor coil 20 is placed over terminal 12 and encircles the terminal 12, making a snug fit with the latter. When the entire assembly is inserted in its liquid bath, the Teflon housing 18 contracts so that the coil 20 tightens its grip about terminal 12 sufficiently so that the electrical junction between coil 20 and terminal 12 is complete and tight. The drawing in FIGURE 4 shows details of the coaxial cable 26 and Teflon housing 18 and the elements making up such cable are shown in exploded form.

The Teflon housing 18 can be replaced by any other resin or plastic or insulating material that has the property of contracting at very low temperatures and returning to room temperatures without deteriorating or losing its insulating properties. The bimetallic strip 10 need not be composed of beryllium copper and a coating of lead, and other materials may be substituted therefor. The outer metal should be one that has a smaller coefficient of expansion than the inner coated layer and such coated layer should be of a material that is superconductive at temperatures close to absolute zero.

It is seen that the present invention provides a means for obtaining reliable electrical junctions at very low temperatures without resorting to the hazards of soldering or relying upon electrically conducting cements. Moreover, the instant invention permits the ready separation of the electrical connectors from their electrical contacts when the entire assembly is removed from the liquid bath. When the entire assembly is at room temperature, the Teflon housing 18 will expand sufficiently to permit the coil 20 to become disengaged from its associated male electrode element 12. Thus it is seen that a simple, economical and easily constructed solderless connector is obtained which is particularly useful in the field of cryogenic devices.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a thin film of metal having superconductive characteristics at temperatures near absolute zero, a separable electrical connector comprising, an insulating supporting structure for said thin film, a laminated metallic strip including a layer of a first metal and a layer of a second metal, said strip being in the general shape of an inverted U with a pair of straight end portions extending at right angles from the sides of said U portion, said second metal being on the lower side of said strip, extending along the lower surfaces of said straight end portions and along the inner surface of said U portion, said second metal being a superconductor at temperatures near absolute zero and having a higher coefficient of linear expansion than said first metal, means for fixedly securing a first one of said straight end portions to said insulated structure yet permitting such end to protrude beyond said structure, said lower surface of the second of said straight end portions making contact with said thin film, whereby exposure to a low temperature environment causes said U portion of said laminated strip to exert an increased force against said second straight end portion, increasing the pressure of the superconductive contact between said strip and said thin film.

2. The combination of claim 1 wherein said first metal of said separable conductor comprises beryllium-copper and said second metal of said separable conductor comprises lead.

3. The combination of claim 1 wherein said U-shaped portion of said laminated strip of said separable conductor has a rectangular cross section and one of said straight end portions of said strip has a circular cross section.

References Cited in the file of this patent

UNITED STATES PATENTS

| | | |
|---|---|---|
| 257,865 | Hamilton | May 16, 1882 |
| 1,635,830 | Gagnon | July 12, 1927 |
| 2,034,334 | Falkenthal | Mar. 17, 1936 |
| 2,303,801 | Van Geel et al. | Dec. 1, 1942 |
| 2,740,942 | Sprigg | Apr. 3, 1956 |
| 2,966,647 | Lentz | Dec. 27, 1960 |

FOREIGN PATENTS

| | | |
|---|---|---|
| 294,249 | Germany | Sept. 22, 1916 |